(12) United States Patent
Schibsbye

(10) Patent No.: US 9,032,674 B2
(45) Date of Patent: May 19, 2015

(54) WIND TURBINE TOWER ARRANGEMENT

(71) Applicant: Karsten Schibsbye, Fredericia (DK)

(72) Inventor: Karsten Schibsbye, Fredericia (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/784,871

(22) Filed: Mar. 5, 2013

(65) Prior Publication Data

US 2014/0250806 A1 Sep. 11, 2014

(51) Int. Cl.
E04C 5/08 (2006.01)
E04H 12/20 (2006.01)
E02D 27/42 (2006.01)
E02D 5/80 (2006.01)
E04H 12/16 (2006.01)
F03D 11/04 (2006.01)

(52) U.S. Cl.
CPC ............. *E04H 12/20* (2013.01); *E02D 27/42* (2013.01); *E02D 5/80* (2013.01); *F05B 2240/9121* (2013.01); *F03D 11/045* (2013.01); *F03D 11/04* (2013.01); *E04H 12/16* (2013.01); Y02E 10/728 (2013.01)

(58) Field of Classification Search
CPC ....... E04H 12/341; E04H 12/16; E04H 12/00; E04H 12/20; E04H 12/34; E02D 27/42; E02D 27/425; E02D 5/80; F03D 11/045; F05B 2240/9121
USPC ........... 52/223.1, 231, 296, 294, 297, 651.01, 52/745.17, 223.3, 223.4, 223.5, 223.13, 52/649.2, 649.02, 223.14, 146, 151
See application file for complete search history.

(56) References Cited

U.S. PATENT DOCUMENTS

| | | | | |
|---|---|---|---|---|
| 1,647,925 A * | 11/1927 | May | ............................. | 52/223.5 |
| 2,705,061 A * | 3/1955 | Getz | ................................ | 52/114 |
| 4,192,215 A * | 3/1980 | Hymans | ........................ | 411/548 |
| 4,707,964 A * | 11/1987 | Hoyt et al. | ................. | 52/741.15 |
| 6,665,990 B1 | 12/2003 | Cody et al. | | |
| 7,276,808 B2 * | 10/2007 | Weitkamp et al. | .............. | 290/55 |
| 7,530,780 B2 | 5/2009 | Kothnur et al. | | |
| 7,618,217 B2 | 11/2009 | Henderson | | |
| 7,770,343 B2 | 8/2010 | Montaner Fraguet et al. | | |
| 7,785,040 B2 | 8/2010 | Kristensen | | |
| 7,805,895 B2 | 10/2010 | Kristensen | | |
| 7,841,143 B2 | 11/2010 | Jensen et al. | | |
| 7,900,406 B2 | 3/2011 | Wobben | | |
| 7,980,814 B2 * | 7/2011 | Nieuwenhuizen | ............ | 415/119 |
| 7,987,640 B2 | 8/2011 | Ollgaard et al. | | |
| 8,104,242 B1 * | 1/2012 | Fouad et al. | ................. | 52/223.4 |
| 8,161,698 B2 | 4/2012 | Migliore | | |
| 8,220,212 B2 | 7/2012 | Stiesdal | | |
| 8,261,502 B2 | 9/2012 | Andersen | | |
| 8,272,173 B2 | 9/2012 | Jakubowski | | |
| 8,281,546 B2 | 10/2012 | Thompson | | |

(Continued)

FOREIGN PATENT DOCUMENTS

EP 1262614 A2 12/2002

Primary Examiner — Chi Q Nguyen

(57) ABSTRACT

A wind turbine tower arrangement (10), having: a concrete tower (12) including an upper portion (14) and a base portion (16); a footer (22) beneath the base portion; a plurality of tendons (30), each tendon spanning an entire height of the concrete tower, at least a portion of each tendon arranged external to concrete (42) forming the concrete tower, and each tendon is pre-stressed to provide compressive force to the concrete in the concrete tower; and a plurality of pilings (28). The tendons are secured by the plurality of pilings.

20 Claims, 4 Drawing Sheets

(56) References Cited

U.S. PATENT DOCUMENTS

| | | | |
|---|---|---|---|
| 8,322,093 B2* | 12/2012 | Zavitz et al. | 52/223.5 |
| 8,458,970 B2* | 6/2013 | Zavitz et al. | 52/223.5 |
| 2001/0000839 A1* | 5/2001 | Ritz | 52/146 |
| 2003/0000165 A1 | 1/2003 | Tadros et al. | |
| 2004/0123553 A1* | 7/2004 | Gruetzmacher | 52/741.14 |
| 2005/0166521 A1* | 8/2005 | Silber | 52/633 |
| 2006/0254168 A1 | 11/2006 | Wobben | |
| 2006/0267348 A1* | 11/2006 | Weitkamp et al. | 290/55 |
| 2008/0313972 A1 | 12/2008 | Grob et al. | |
| 2010/0071301 A1* | 3/2010 | Herrius de Roest | 52/651.07 |
| 2010/0095617 A1 | 4/2010 | Scholte-Wassink | |
| 2011/0113708 A1* | 5/2011 | Skjaerbaek et al. | 52/223.1 |
| 2011/0138704 A1* | 6/2011 | Bagepalli et al. | 52/147 |
| 2011/0239564 A1* | 10/2011 | Zheng et al. | 52/231 |
| 2011/0271634 A1 | 11/2011 | Rasmussen | |
| 2011/0278431 A1* | 11/2011 | Knox et al. | 249/141 |
| 2012/0159873 A1 | 6/2012 | Puigeorbe Punzano et al. | |
| 2012/0167499 A1 | 7/2012 | Knisel | |
| 2012/0266552 A1* | 10/2012 | Huynh et al. | 52/223.4 |

* cited by examiner

WIND TURBINE TOWER ARRANGEMENT

FIELD OF THE INVENTION

The invention relates to a tower arrangement for a wind turbine power generation unit. In particular, the invention relates to a concrete tower supported by a footer and having pre-stressing tendons secured to stabilizing pilings.

BACKGROUND OF THE INVENTION

Support towers for wind turbine power generation units may include a base portion that sits on the ground and acts as part of the foundation as well as a tower sitting atop the base. The support towers are subject to forces from the wind that must be resisted to prevent the support tower from being toppled. These wind forces and associated resistance of the support tower create compressive and tensile stresses within the support tower structure. These stresses must be accounted for in the design of the support tower in order to prevent fatigue failure that may result from these stresses occurring over time.

Consideration must also be given to the logistics of creating such a large structure given the limitations of the transportation infrastructure used to transport the support tower from a point of manufacture to the final site where the support tower will be used. Specifically, roadways and railways are not designed for the transportation of large support towers. One solution to this has been to create modular support towers with individual modules of various materials that can be shipped using the existing infrastructure and then assembled on site. However, this sort of transportation is still difficult and assembling the components can be complex and time consuming.

Another solution has been to cast a concrete support tower in place using methods such as slip-form casting. In this method concrete is poured into an annular form wherein it hardens. The form is moved upward and the process repeated until the tower is completed. However, this process is expensive, requires substantial labor and equipment, and is not well suited to handle changing diameters of the support tower. However, this technique has several advantages. When the base is cast in place like in this method, the base can have a much larger diameter than bases that are shipped and assembled. For this reason the base can be substantially heavier as well.

Reinforcing tendons are often used in conjunction with the cast concrete when the support tower is cast in place. The tendons may span from the foundation to a top of the support tower and may be placed in tension. Since the tendons are secured to the support tower at a bottom of the base and at the top, the tension creates a compressive load on the concrete of the support tower. This pre-stressing arrangement takes advantage of concrete's inherent superior compressive strength and reduces the times the concrete must utilize its inferior tensile strength to resist the wind forces. Conventionally, these tendons are placed within the concrete forming the support tower.

In all of these methods the base has been supported with an extremely substantial footer intended provide a dual role of preventing the support tower from sinking and providing resistance to the lateral wind forces.

BRIEF DESCRIPTION OF THE DRAWINGS

The invention is explained in the following description in view of the drawings that show.

DETAILED DESCRIPTION OF THE INVENTION

The present inventor has recognized that the increased weight and larger diameter of cast concrete base provides more lateral stability to the tower than do the narrower assembled base counterparts. This lateral stability now provided by the cast base provides resistance to the lateral forces acting on the support tower. The inventor has further realized that because this cast-base lateral stability exists, but the lateral stability requirements of the support tower have remained the same, the footer under the base no longer needs to provide as much lateral stability as before in order to satisfy the lateral stability requirement of the support tower, and therefore may be made smaller. Taking this one step further, the inventor proposes adding pilings, secured to the tendons, to enhance the lateral stability of the support tower. This, in turn, allows for a footer of even further reduced size. The reduced footer and piling arrangement costs less than a conventional footer, which is much more substantial in size, and when used with a cast concrete base having the larger diameter, provides sufficient lateral stability for the support tower.

Figure 1:
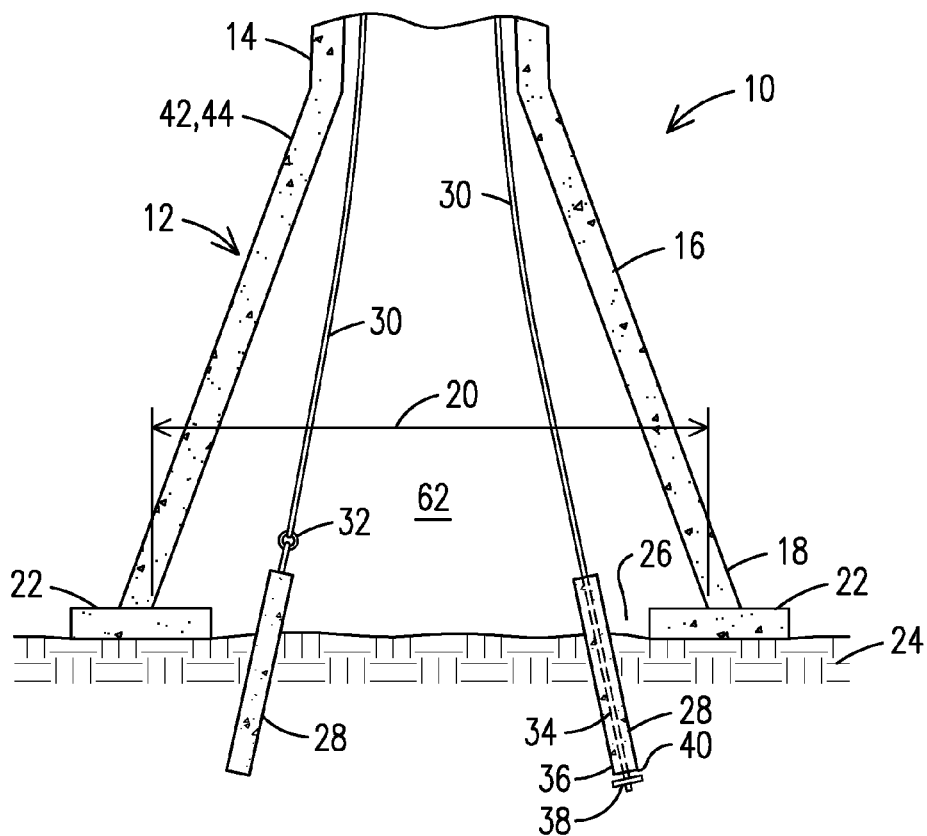
FIGS. 1-2 are cross sections of various exemplary embodiments of a base of the cast wind turbine tower arrangement where the tendons are within the cast concrete tower.

FIG. 1 show a cross section of an exemplary embodiment of the support tower arrangement 10, including a support tower 12 having an upper portion 14 and a base portion 16. The base portion 16 is shown having an exaggerated slope for illustrative purposes. The base may have a flared shape such that at a base end 18 a diameter 20 of the base portion 16 is the greatest. The base portion 16 may be cast in-situ using any casting technique, such as slip-form casting etc. The base end 18 sits on a footer 22, which sits in and/or on the ground 24. The footer 22 may have any suitable shape. For example, the footer 22 may take on a washer shape where there is a hole 26 formed by the washer shape. The support tower arrangement 10 may further include a plurality of pilings 28 that may acts as anchors for a plurality of tendons 30.

The pilings 28 may be disposed around the support tower 12 in, for example, an annular array, in order to provide lateral support effective to aid the support tower 12 in resisting the lateral wind forces. Pilings 28 may be the type known to those in the art and may be located in the hole 26 of the washer as shown in FIG. 1. The pilings 28 may be of any material known to those in the art, including concrete cast around steel reinforcing bars. The size, shape, depth, and location etc of the pilings 28 may be adjusted as necessary to accommodate the requirements of the particular support tower 12 being supported, such as height, base diameter 20, a weight of the base portion 16, and environmental conditions including wind forces and type of ground 24 in or on which the footer 22 is disposed.

The tendons 30 may at least partly outside the concrete forming the support tower 12, and may be disposed about the support tower 12 in, for example, an annular array, and may be secured to the pilings 28. The annular array of tendons 30 may correspond closely to the annular array of the pilings 28. For there may be one piling 28 for each tendon 30. Alternately, there may be several tendons 30 secured to one piling 28. Any arrangement of tendons 30 and pilings 28 may be used so long as it is sufficient to provide the lateral support needed. The use of a footer 22 and tendons 30 in this manner allows for a wide variety of support arrangements that can be adjusted as necessary to accommodate varying ground conditions. In addition to their structural role, the tendons 30 may act as an electrical ground for the support tower 12. Further, additional reinforcing bars may be disposed, for example, circumferentially within the support tower 12, to provide circumferential compressive pre-stressing.

The tendons 30 may be discrete from the pilings 28 such that a tendon 30 may be attached to a piling at an attachment point 32 external to the piling 28. In this manner the pilings 28 can be installed and the tendons 39 secured to the pilings 28 at some future point, which provides flexibility in design and construction. Alternately, the tendons 30 may be an integral part of the piling 28. For example, a second end 34 of the tendon 30 may be incorporated into the piling 28. This may be accomplished, for example, when a piling 28 is made of concrete and cast in-situ, and cast around the tendon 30. Alternately, or in addition, the second end 34 of the tendon 30 may extend past a bearing end 36 of the piling 28, and the second end 34 may be secured outside of the piling 28 by a suitable fastener 38 etc. In this manner the fastener 38 may rest against a bearing surface 40 of the piling 28 at the bearing end 36. Alternately, the fastener 38 may be integral to the piling 28 and the second end 34 of the tendon 30 may not extend past the bearing end 36 of the piling 28.

The tendons 30 may also serve to create a compressive pre-tension load on the concrete 42 making up the wall(s) 44 of the support tower 12, resulting in a compressive load path through an entire height of the support tower 12. In this configuration, prior to assembly the tendons 30 are stretched in order to create a tensile load within the tendons 30. The tendons 30 are then secured to the support tower 12 and the mechanism imparting the tensile load is released. The tendons 30 are held in tension by the concrete 42 in the wall 44, and as a result, the concrete 42 is placed in a compressive load. This compressive pre-stressing helps the concrete 42 stay in compression under a wider variety of load conditions than were the compressive pre-stressing not present. This, in turn, reduces the instances where the concrete 42 is placed in tension due to the wind forces, and this increases a life of the concrete 42. As disclosed in U.S. Pat. No. 8,220,212 to Stiesdal, which is incorporated herein in its entirety, because each tendon 30 spans at least from the base end 18 to a top end (not shown), the magnitude of the compressive load in the concrete 42 is uniform from the base end 18 to the top end (not shown). However, a horizontal cross section of the concrete 42 changes from the base end 18 to the top end (not shown), and hence a cross sectional area of the concrete 42 changes. In order to enable shrinking cross sectional areas (with the height of the support tower 12) to cope with the same magnitude of compressive force, a compressive strength of the concrete 42 may increase as the cross sectional area of the concrete 42 decreases.

Figure 2:
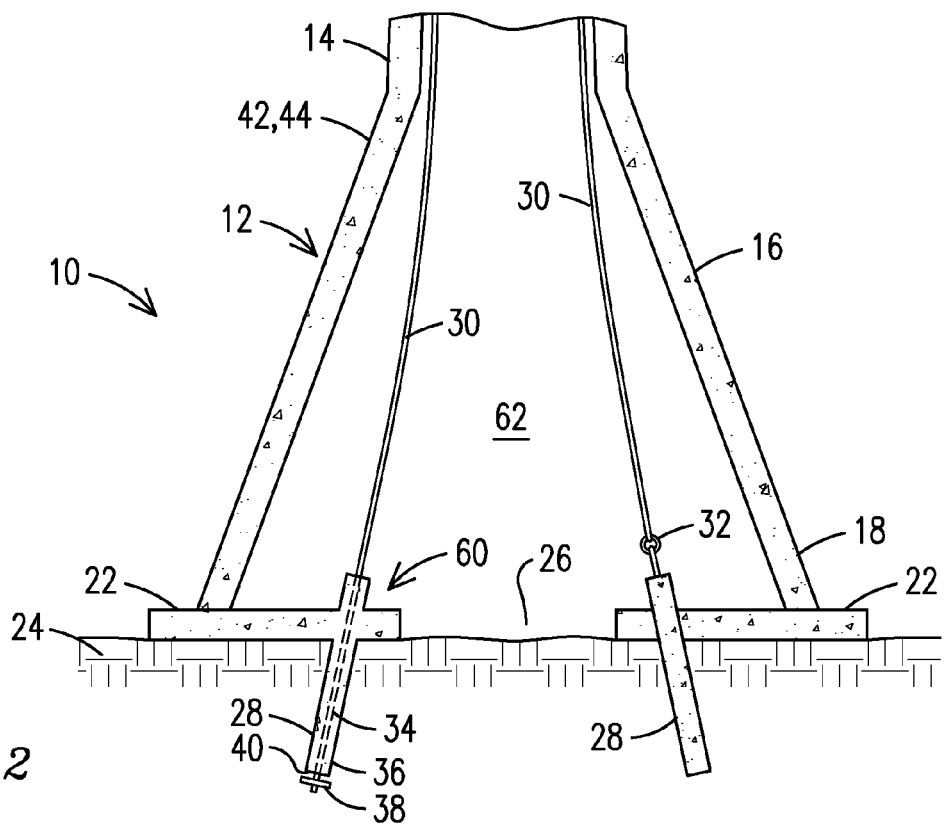

In an alternate exemplary embodiment shown in FIG. 2, the pilings 28 may penetrate the footer 22. In a first example, this may be achieved when the piling 28 and the footer 22 are cast in-situ, and both are cast at the same time to form a single structure that is a first footer-and-piling structure 60 that has characteristics of both the footer 22 and the pilings 28. A first footer and piling structure 60 of this nature is shown on the left side of FIG. 2. Alternately, the piling 28 may be created first and the footer 22 cast around the already formed piling 28. In this case the piling 28 may be made of concrete or any other suitable material. When placed as shown in FIG. 2, the pilings 28 can accommodate tendons 30 disposed in a hollow space 62 formed by the support tower 12. In this configuration the first footer and piling structure 60 may act as a bottom plate, such that the support tower 12 would be compressed between the top plate (not shown) and the first footer and piling structure 60. Further, the pilings 28 extend into the ground 24 and anchor the support tower 12 much like roots would support a tree.

Figure 3:
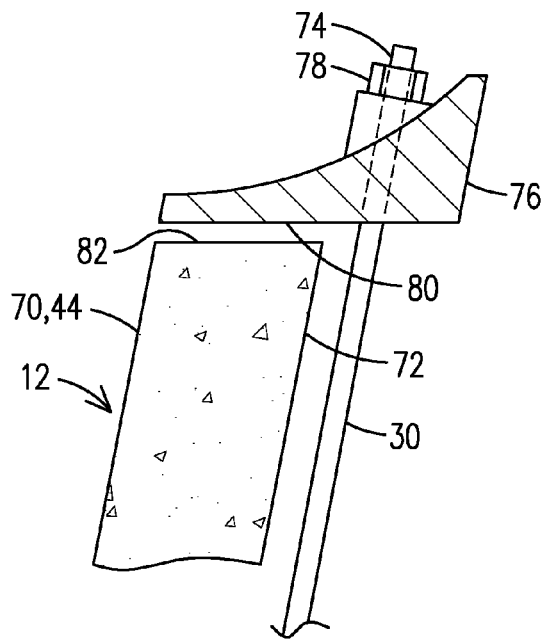
FIGS. 3-4 are cross sections of various exemplary embodiments of top plates used with tendons disposed within the cast concrete tower.

FIG. 3 shows an exemplary embodiment of how tendons 30 may be secured to the top end 70 of the upper portion 14 of the support tower 12. In this exemplary embodiment the tendons 30 are disposed along an inner surface 72 of the wall 44 and a first end 74 of the tendon 30 is secured to a top plate 76. The top plate 76 may be made of, for example, steel, or any other material suitable to transfer the tensile load of the individual tendons 30 to the top end 70 of the upper portion 14 of the support tower 12. The first end 74 of the tendon 30 may be secured to or through the top plate 76 via a suitable fastener 78. The top plate 76 may have a top plate bearing surface 80 that abuts a top end bearing surface 82 where the tensile load is transferred. Various arrangements may be used to transfer the load depending on the design requirements. The top end bearing surface 82 may be additionally supported as necessary to ensure it can accommodate the load transferred to it.

Figure 4:
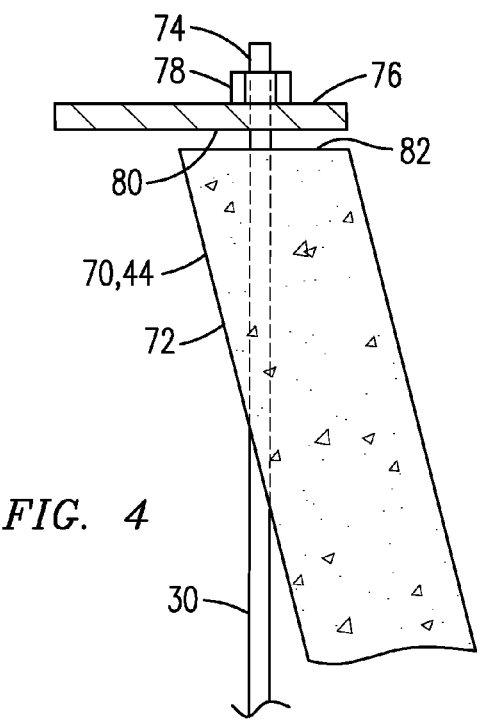

FIG. 4 shows an alternate exemplary embodiment of the arrangement at the top end 70. In this exemplary embodiment the first ends 74 of the tendons 30 penetrate the wall 44 of the support tower 12 and are secured to the top plate 76 through the top end bearing surface 82 and the top plate bearing surface 80. This may avoid any cantilever effect that the exemplary embodiment of FIG. 3 may have on the top end bearing surface 82 and result in a more uniform distribution of force across the top end bearing surface 82 and the top plate bearing surface 80.

Figure 5:
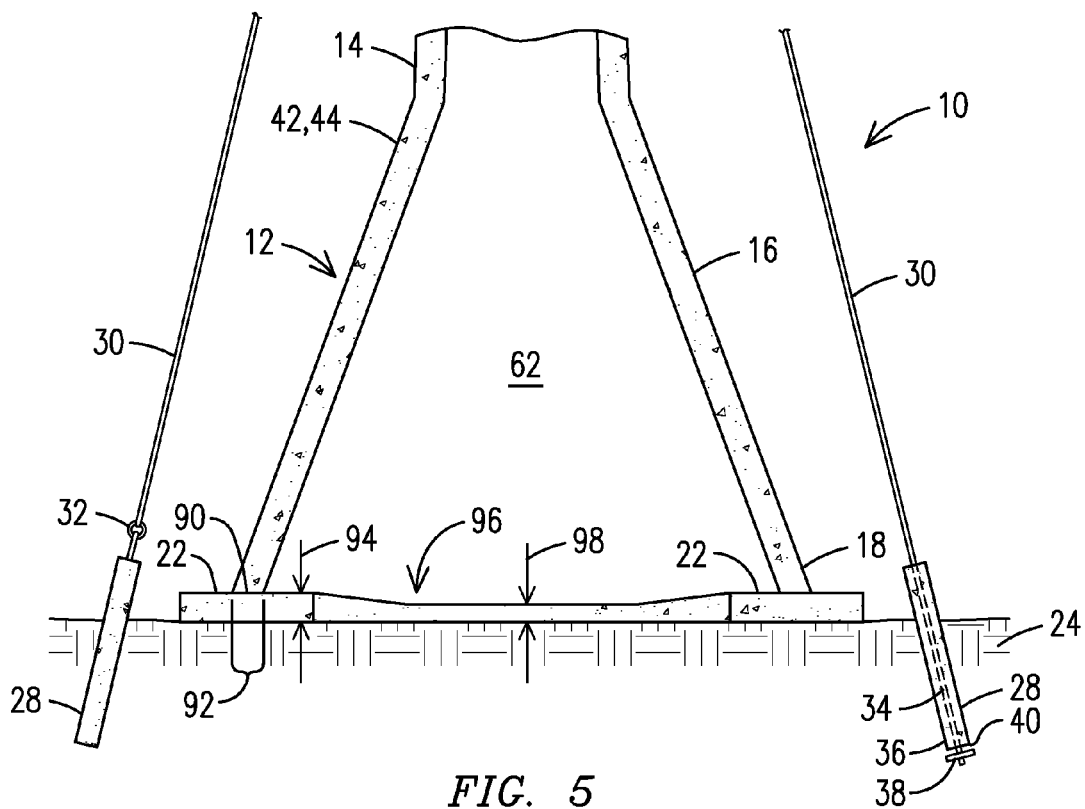
FIGS. 5-6 are cross sections of various exemplary embodiments of a base of the cast wind turbine tower arrangement where the tendons are outside of the cast concrete tower.

In an alternate exemplary embodiment shown in FIG. 5, the pilings 28 are disposed outside of the footer 22, and may be disposed in an annular array as before. The relative positions of the components of the support tower arrangement 10 are exaggerated for illustrative purposes. In this configuration the tendons 30 are no longer disposed in the hollow space 62 defined by the support tower 12. Instead, the tendons 30 are also arranged outside the support tower 12 and are associated with the pilings 28. There may be one or more tendons 30 secured to each piling 28.

The base end 18 and the footer 22 abut each other at an interface 90 such that a covered region 92 of the footer 22 is directly under the interface 90 and may have a first thickness 94. The footer may also include a center region 96 that may have a second thickness 98. The center region 96 may be used to support additional equipment etc. As a result, the center region 96 may not require as much strength, and so the first thickness 94 may be greater than the second thickness 98.

Figure 6:
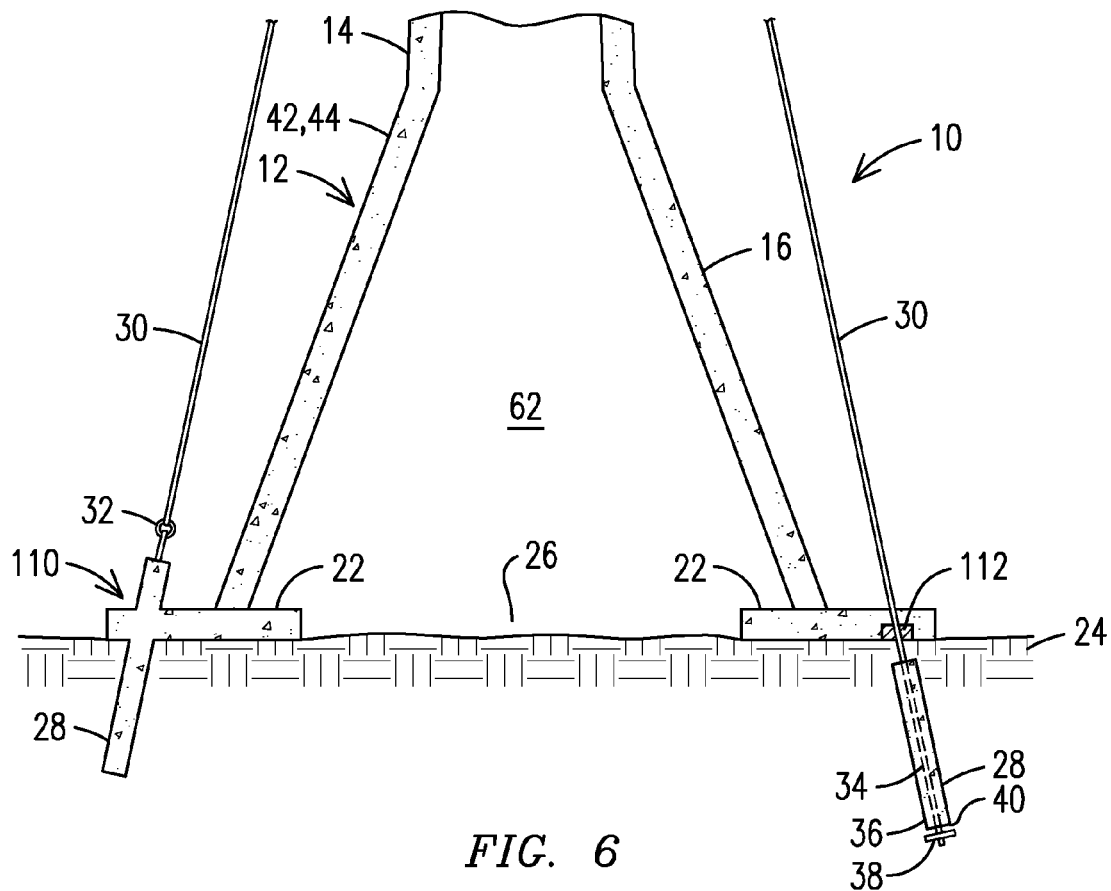

In an alternate exemplary embodiment shown in FIG. 6, the pilings 28 are outside of the wall 44 of the support tower 12. Shown on the left in FIG. 6 is a second footer and piling structure 110 where the piling 28 is again incorporated as part of the footer 22, but the piling is outside the wall 44. In this arrangement the compressive load may be transmitted to the wall 44 by compressing the wall 44 between the top plate 76 and second footer and piling structure 110. An alternate exemplary embodiment shown on the right side of FIG. 6 shows the piling 28 buried under and discrete from the footer 22. As shown the tendon 30 is integral to the buried piling 28. However, the tendon 30 may be secured using the attachment point 32 which may also be disposed under the footer 22. In this arrangement the pilings 28 could be installed first and the footer installed over the pilings 28. In this arrangement it is also possible to pre-stress the walls 44 between the top plate (not shown) and the footer 22 by installing footer hardware 112 in the footer 22 to secure the tendon 30 to the footer 22. In this manner, tension from the tendon 30 may provide the necessary compressive forces. Further, because the tendon 30 extends below the footer 22 it can also anchor the support tower 12 to the piling 28 below.

Figure 7:
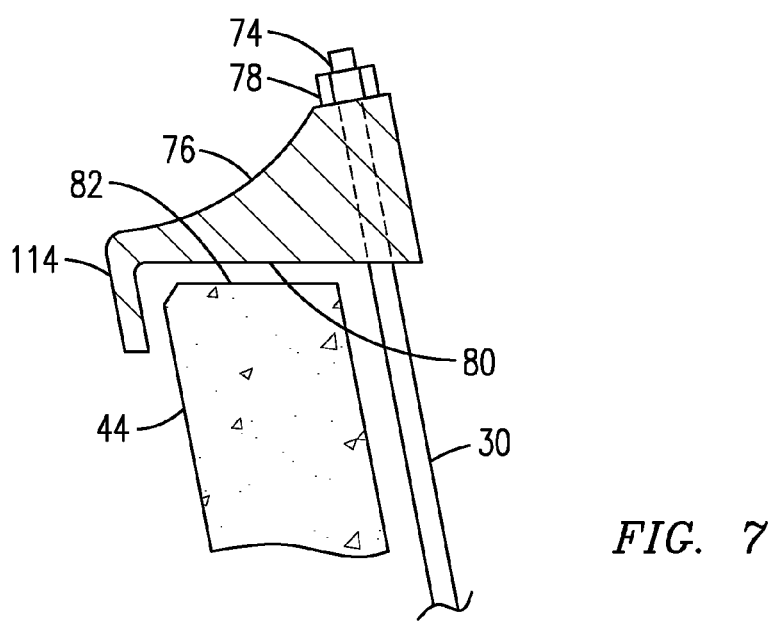
FIG. 7 is a cross section of an exemplary embodiment of a top plate used with tendons disposed outside the cast concrete tower.

FIG. 7 shows an exemplary embodiment of a top plate 76 that may be used when the tendons 30 are disposed outside the wall 44. In this configuration the top plate 76 again secures the first end 74 of the tendon 30 to the top end 70 of the wall 44 by abutting the top plate bearing surface 80 against the top end bearing surface 82. There may be a catch feature 114 that secures the top plate 76 against lateral movement.

Figure 8:
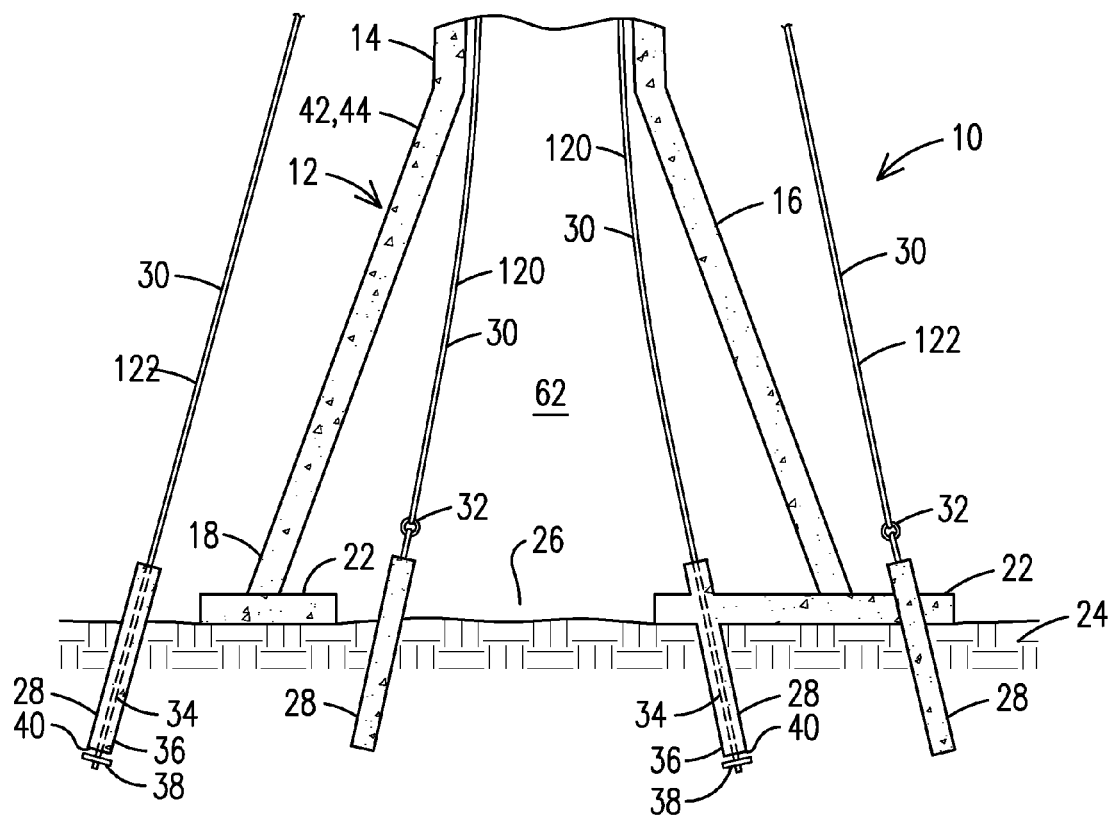
FIG. 8 is a cross section of an exemplary embodiment of a base of the cast wind turbine tower arrangement where tendons are disposed both within and outside of the cast concrete tower.

In another alternate exemplary embodiment shown in FIG. 8, the support tower arrangement 10 may include pilings 28 on both sides of the wall 44. Inner tendons 120 may or may not be arranged annularly, and may be disposed in the hole 26, or integral to the footer 22, or both. Likewise, outer tendons 122 may or may not be arranged annularly, and may or may not be integral to the footer 22. In addition, there may be designs where circumferential portions of the support tower 12 are compressed by inner tendons 120, and other circumferential portions are compressed by outer tendons 122.

Figure 9:
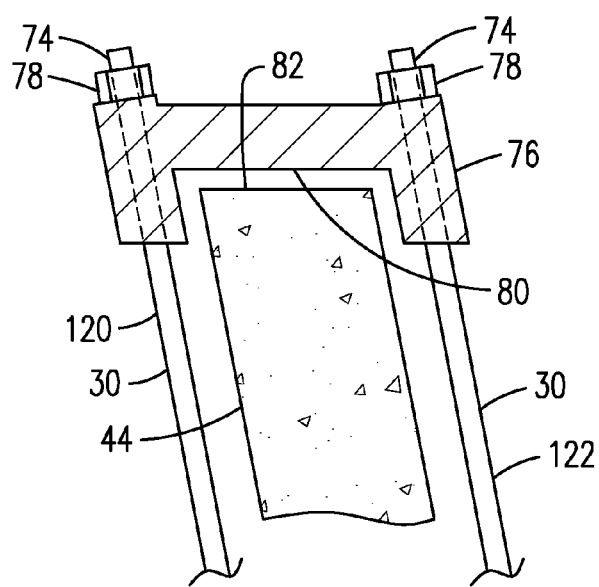
FIG. 9 is a cross section of an exemplary embodiment of a top plate used with tendons disposed both within and outside of the cast concrete tower.

FIG. 9 shows an exemplary embodiment of a top plate 76 configured to secure first ends 74 of inner tendons 120 and outer tendons 122 using suitable fasteners 78. In this exemplary embodiment any cantilever effect of the tendons may be reduced or eliminated due to the inherent balancing of forces associated with the inner tendons 120 against forces associated with the outer tendons 122.

From the foregoing it can be seen that the inventor has devised a new support tower arrangement that reduces the size and cost associated with conventional footers. The unique arrangement uses a clever combination of individual construction techniques that can readily be applied to generate the configuration disclosed herein. This newer arrangement is simple, effective, easy to implement, and will save time and money, and consequently it represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine tower arrangement, comprising:
a concrete tower comprising an upper portion and a base;
a footer directly supporting the base portion;
a plurality of tendons, each tendon of the plurality of tendons spanning an entire height of the concrete tower, at least a portion of each tendon of the plurality of tendons arranged external to concrete forming the concrete tower, and wherein each tendon of the plurality of tendons is pre-stressed to provide compressive force to the concrete of the concrete tower; and
a plurality of pilings configured such that at least a portion of each piling is disposed below the footer and in ground, wherein the plurality of tendons are secured by the plurality of pilings.

2. The wind turbine tower arrangement of claim 1, wherein the footer comprises a washer shape defining a hole through to the ground.

3. The wind turbine tower arrangement of claim 1, further comprising a top plate disposed at the upper portion and configured to secure the plurality of tendons to the upper portion.

4. The wind turbine tower arrangement of claim 1, wherein at least one of the plurality of tendons penetrates the concrete of the concrete tower at the upper portion.

5. The wind turbine tower arrangement of claim 1, wherein the plurality of tendons are discrete from the plurality of pilings.

6. The wind turbine tower arrangement of claim 1, wherein the plurality of pilings comprise concrete and wherein at least one piling of the plurality of pilings encapsulates an end of at least one tendon of the plurality of tendons.

7. The wind turbine tower arrangement of claim 1, wherein the footer and at least one of the plurality of pilings are not in contact with each other.

8. The wind turbine tower arrangement of claim 7, wherein the footer comprises a washer shape that defines a hole in the footer defining a hole through to the ground, and wherein at least one of the plurality of pilings is disposed in the ground under the hole of the footer washer shape.

9. The wind turbine tower arrangement of claim 7, wherein at least one of the plurality of pilings is disposed under the footer and at least one of the plurality of tendons extends through the footer to be secured by the at least one of the plurality of pilings.

10. The wind turbine tower arrangement of claim 1, wherein at least one of the plurality of pilings penetrates the footer.

11. The wind turbine tower arrangement of claim 10, wherein at least one of the plurality of pilings and the footer comprise concrete and are cast as a single structure.

12. A wind turbine tower arrangement, comprising:
a cast concrete tower comprising an upper portion and a monolithic cast base portion, the base portion comprising a flare characterized by a different slope than the upper portion and comprising a greatest diameter at a base end of the base portion;
a footer directly supporting the flared base end;
a plurality of tendons, each tendon of the plurality of tendons secured at a first end to a top end of the upper portion and at a second end in such a manner as to provide a compressive load path through an entire height of the cast concrete tower, and each tendon of the plurality of tendons disposed at least partially external to cast concrete of the cast concrete tower; and
a plurality of pilings disposed in ground and configured to anchor the plurality of tendons.

13. The wind turbine tower arrangement of claim 12, wherein a thickness of the footer disposed under an interface with the cast concrete of the cast concrete tower is greater than a thickness of the footer not disposed under the interface.

14. The wind turbine tower arrangement of claim 12, further comprising a top plate secured to the top end of the tower and secured to the first ends of the plurality of tendons.

15. The wind turbine tower arrangement of claim 14, wherein the footer is secured to the plurality of tendons, and wherein tension in the plurality of tendons compresses the cast concrete tower between the top plate and the footer.

16. The wind turbine tower arrangement of claim 15, wherein at least one of the plurality of pilings is incorporated into the footer and the plurality of tendons are secured to the plurality of pilings.

17. The wind turbine tower arrangement of claim 15, wherein at least one of the plurality of pilings is incorporated into the footer and the at least one of the plurality of pilings is cast around at least one end of the plurality of pilings.

18. The wind turbine tower arrangement of claim 12, wherein the footer is remotely disposed from at least one of the plurality of pilings.

19. The wind turbine tower arrangement of claim 18, wherein the footer comprises a washer shape that defines a hole in the footer through to the ground, and at least one of the plurality of pilings is disposed in the ground under the hole of the footer washer shape.

20. The wind turbine tower arrangement of claim 12, wherein at least one of the plurality of tendons is at least partially disposed in a hollow space within the cast concrete tower.

* * * * *